Feb. 4, 1936.  S. J. NORDSTROM  2,029,438
PLUG VALVE
Filed June 1, 1931  3 Sheets-Sheet 2
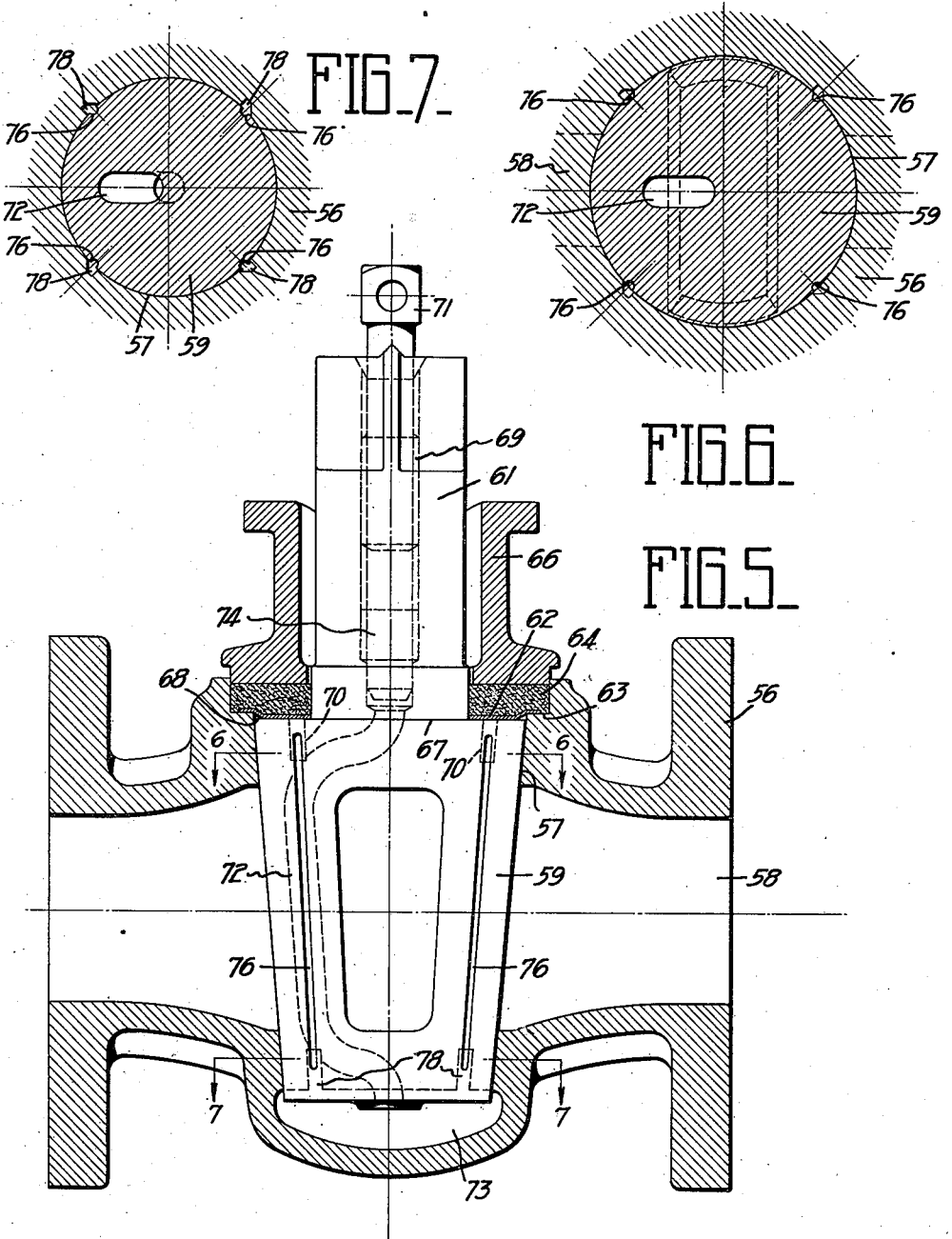
INVENTOR.
Sven J. Nordstrom
BY
White, Prost, Fehr & Lothrop
ATTORNEYS.

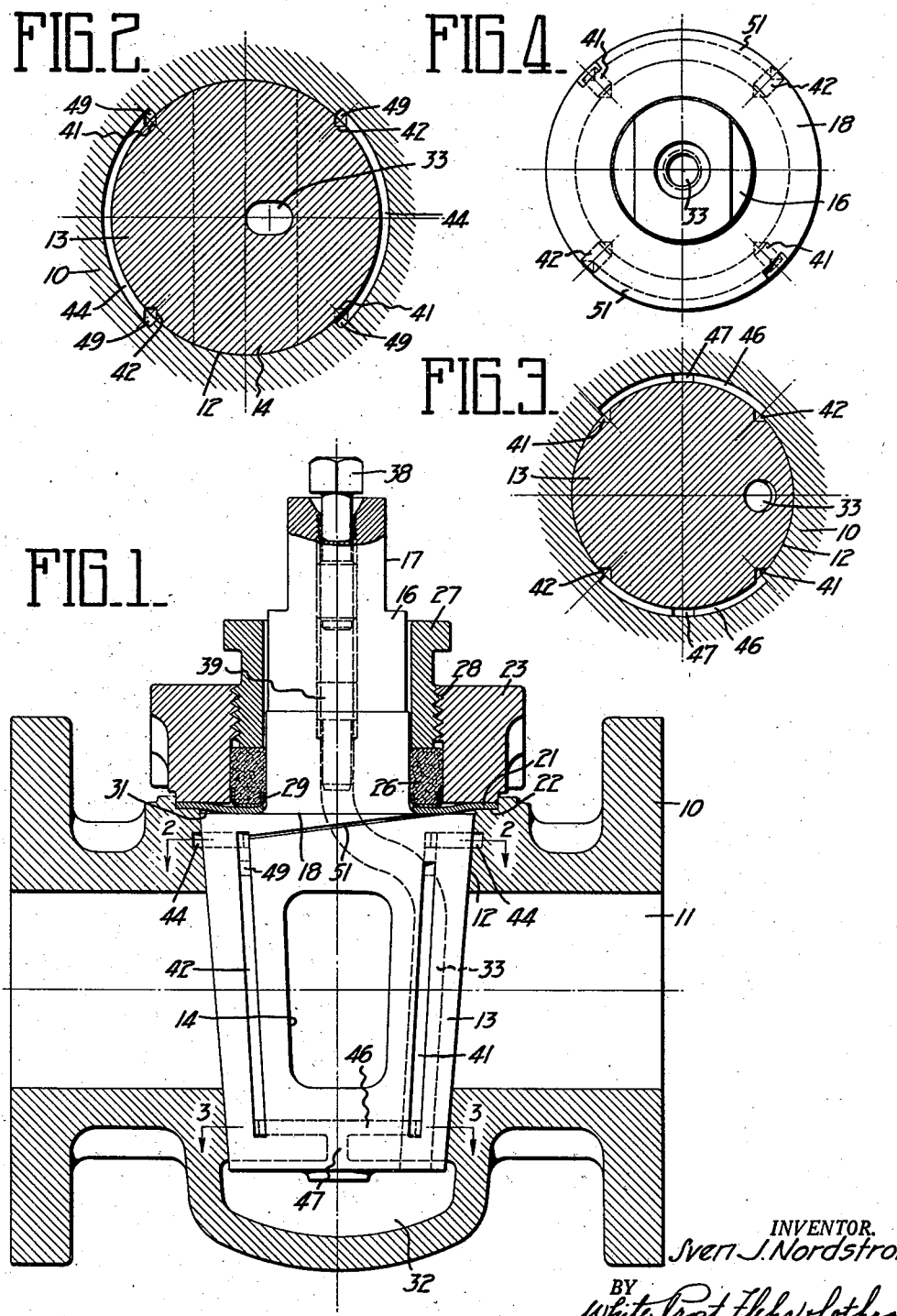

Feb. 4, 1936.                S. J. NORDSTROM                2,029,438
                                PLUG VALVE
                             Filed June 1, 1931            3 Sheets-Sheet 3
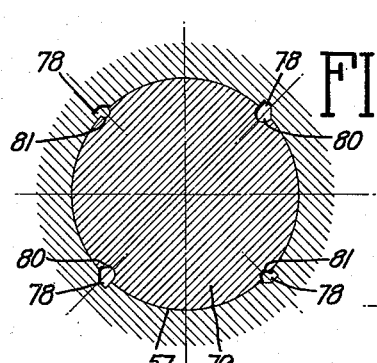
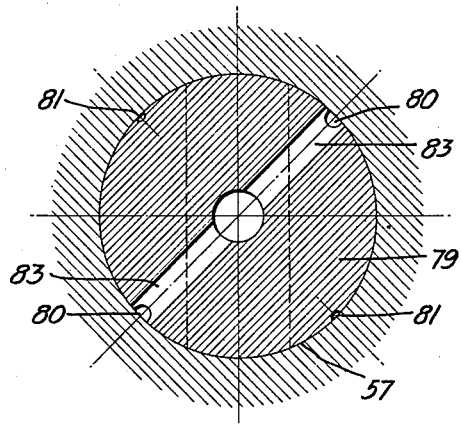
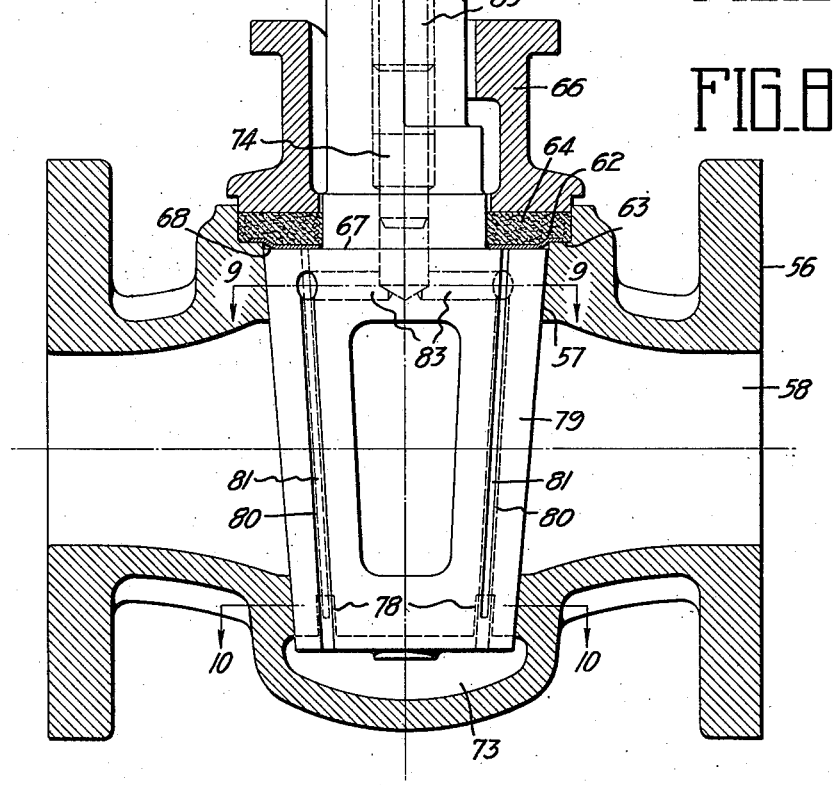
INVENTOR.
Sven J. Nordstrom
BY White, Prost, Flehr & Lothrop
ATTORNEYS.

Patented Feb. 4, 1936

2,029,438

UNITED STATES PATENT OFFICE 2,029,438

PLUG VALVE

Sven Johan Nordstrom, Piedmont, Calif., assignor to Merco Nordstrom Valve Company, San Francisco, Calif., a corporation of Delaware Application June 1, 1931, Serial No. 541,218

23 Claims. (Cl. 251—93)

This invention relates generally to plug valves of the type having provision for applying viscous lubricant under pressure to certain parts thereof. It has particular application to such valves having tapered plugs, and which employ the compressed lubricant to hydraulically jack the plug from its seat.

It is an object of the invention to generally improve upon plug valves of the above character, whereby lubrication thereof is made more effective and efficient.

It is a further object of the invention to devise valves of the above character in such a manner that the lubricant systems thereof are capable of forming a plurality of desirable functions. Thus it is characteristic of the preferred form of the present invention that the lubricant system thereof enables hydraulic jacking of the plug with respect to its seat, lubrication and sealing of the valve working surfaces, and sealing of certain cooperating surfaces to prevent leakage of line fluid between the casing and the stem of the valve, without interfering with the jacking action.

It is another object of the invention to devise a new arrangement or form of lubricant channels interrupting the valve working surfaces of a plug valve utilizing lubricant under pressure, whereby the advantages of sealed port lubrication can be secured, without an undue washing away of the lubricant in certain channels which are exposed to the line pressure when the plug is turned between open and closed position.

Further objects of the invention will appear from the following description in which the preferred embodiments of the invention are set forth in detail in conjunction with the accompanying drawings. It is to be understood that the appended claims are to be accorded a range of equivalents consistent with the state of the prior art.

Referring to the drawings:

Figure 1 is a side elevational view of a valve incorporating the present invention, shown partly in cross section.

Fig. 2 is a cross sectional detail taken along the line 2—2 of Fig. 1.

Fig. 3 is a cross sectional detail taken along the line 3—3 of Fig. 1.

Fig. 4 is a plan view of the plug incorporated in the valve of Fig. 1, apart from the valve casing.

Fig. 5 is a side elevational view illustrating a modified form of plug valve incorporating the present invention, certain parts being in cross section.

Fig. 6 is a cross sectional detail taken along the line 6—6 of Fig. 5.

Fig. 7 is a cross sectional detail taken along the line 7—7 of Fig. 5.

Fig. 8 is a side elevational view illustrating a third modified form of my invention, certain parts being in cross section.

Fig. 9 is a cross sectional detail taken along the line 9—9 of Fig. 8.

Fig. 10 is a cross sectional detail taken along the line 10—10 of Fig. 8.

Referring first to the modification illustrated in Figs. 1 to 4 inclusive, the valve shown therein consists of a casing 10 provided with a passageway 11 for flow of fluid thru the same. Formed within the casing and extending transversely to the passageway 11 there is a tapered valve seat or bore 12. Rotatably positioned within the valve seat 12 there is a tapered plug 13, provided with a port 14 adapted to register with passageway 11 for open position of the valve. To enable turning of the plug there is a stem 16 extending into the casing and operably connected to the large end of plug 13. The outer end of stem 16 is shown provided with a flattened or noncircular portion 17 to enable application of a wrench or handle. The proportioning of the stem and plug is such as to provide an annular shoulder 18 at the large end of the plug surrounding the inner end of stem 16. The surface of this shoulder is preferably relatively smooth, and in the particular embodiment illustrated this surface is in a plane at right angles to the axis of rotation of the plug.

Positioned adjacent the large end of the plug there is a diaphragm 21, preferably made of relatively thin flexible sheet metal. The outer peripheral portion of diaphragm 21 is sealed with respect to the casing. Thus this portion of the diaphragm is shown seated upon a shoulder 22 formed upon the valve casing 10 and is clamped between this shoulder and a lower annular surface formed upon a suitable clamping member 23. Bolts or equivalent means are employed for retaining clamping member 23 upon the casing, and if desired a suitable gasket can be interposed between the outer peripheral portion of diaphragm 21 and shoulder 22 to provide a more effective seal. Diaphragm 21 is apertured to accommodate the inner end of stem 16 so that it can be described as being a flexible metallic washer.

Clamping member 23 has a central opening of such dimensions that it is spaced from the periphery of stem 16, and within the space so formed there is a resilient annular packing 26. In order to apply force to the upper surface of packing 26 there is shown a follower ring 27 having a threaded connection 28 with clamping member 23. Interposed between the inner peripheral portion of diaphragm 21 and the lower surface of packing 26, there is a washer 29, preferably formed U-shape in cross section and of pressed metal.

By turning down gland 27, it is apparent that the resilient packing 26 is compressed, and force is thus applied to the inner peripheral portion of diaphragm 21 to force this portion in engagement with shoulder 18 formed upon the valve plug. The surfaces thus brought into contact or engagement, that is the lower surface of the inner portion of diaphragm 21 and the annular surface of shoulder 18 engaging therewith, can be termed sealing surfaces, and are supplied with viscous lubricant from the lubricating system of the valve as will be presently explained. Resilient packing 26 acting thru diaphragm 21, serves as means for yieldingly urging the valve plug into its seat. For practical reasons, inherent in the manufacture of all tapered plug valves, the plane of shoulder 18 lies slightly below the plane of shoulder 22, so that the inner peripheral portion of diaphragm 21 is deflected or bent downward a certain amount. Thus an annular cavity 31 is formed below diaphragm 21, this cavity being of appreciable depth at its outer periphery and tapering to a line of contact at its inner periphery, and surrounding and being in communication with the cooperating surfaces between the diaphragm 21 and shoulder 18.

The lubricating system provided for the valve of Figs. 1 to 4 includes a lubricant chamber 32 formed within the valve casing at the small end of the plug. For purposes of description this chamber 32 will be termed a secondary lubricating chamber. For supplying viscous lubricant under pressure to chamber 32, a lubricant duct 33 is provided which extends axially of stem 16, and longitudinally down thru the valve plug 13. This duct can be conveniently provided by coring and is shown offset from the axis of the plug, to accommodate port 14. The upper end portion of duct 33 is threaded to receive a lubricant pressure screw 38. A suitable check valve 39 is also positioned within duct 33 below screw 38, in order to prevent back flow of lubricant upon removal of screw 38. Since pressure is applied directly to the lubricant in duct 33, and since lubricant from this duct is forced into chamber 32 upon turning down screw 38, this duct can be termed a primary lubricant chamber.

Certain lubricant channels are provided in the valve working surfaces, and these channels form a part of the valve lubricating system. Thus in the modification illustrated in Figs. 1 to 4 inclusive, the periphery of the valve plug 13 is provided with longitudinal lubricant grooves or channels 41 and 42 which are spaced apart as illustrated in Fig. 3. The upper portion of valve seat 12 is provided with a pair of opposed arcuate lubricant channels 44, and the lower portion of the seat is provided with a pair of opposed arcuate channels 46. Channels 47 communicate between arcuate channels 46 and the lubricant chamber 32. For certain positions of the valve plug as will be presently explained, arcuate grooves 46 are also in communication with longitudinal plug channels 41 and 42. It will be noted in Fig. 1 that longitudinal plug channels 41 do not extend as far toward the large end of the plug as channels 42. Therefore in order to enable arcuate channels 44 to communicate with both sets of longitudinal channels 41 and 42, relatively short branch channel portions 49 extend downwardly from the ends of arcuate channels 44.

For closed position of the valve illustrated in Figs. 1 to 4 inclusive, longitudinal channels 41 and 42 have their lower ends in communication with the ends of arcuate channels 46, while the upper ends of these longitudinal channels are in communication with the ends of the upper arcuate channels 44. Therefore assuming that chamber 32 and duct 33 are filled with viscous lubricant, application of pressure to this lubricant by virtue of turning down screw 38, causes lubricant to flow into all of the lubricant channels in the valve working surfaces, the flow being thru channels 47, arcuate channels 46, upwardly thru longitudinal channels 41 and 42, and then into arcuate channel 44. Likewise these channels form two complete circuits surrounding the passage 11 through the valve casing on each side of the valve plug, to afford a sealed port effect. By applying a sufficiently high pressure to the lubricant in chamber 32, the valve plug can be jacked from its seat, even though it may have become fast with respect to the casing thru rust or corrosion. At the time of jacking, because of the added clearance between the valve working surfaces, lubricant is extruded from the lubricant channels and smeared between the plug and the casing, to facilitate turning of the plug and to provide more adequate sealing. When the valve plug is turned from closed to open position, communication is again established between the longitudinal and arcuate grooves, to provide a sealed port effect. However as the plug is being turned between open and closed position, certain of the longitudinal channels which are exposed to the line fluid, are cut off from communication with secondary chamber 32. For example referring to Figs. 2 and 3, if the plug is turned to the right thru an angle of 90 degrees to open the same, in an intermediate position channels 42 which are exposed to the line are cut off from communication with arcuate channels 46, and at the same time longitudinal channels 41 are cut off from branch channels 49 to prevent a circulation of lubricant upwardly thru channels 41, thru arcuate channels 44, into channels 42. Thus no undue extrusion of lubricant thru exposed channels will occur when the plug is being turned between open and closed positions. It should also be noted that the lubricant channels exposed to the line fluid are formed within plug 13, rather than in the valve seat. This is a distinct advantage as it has been found that the lubricant in such exposed channels is not readily washed out by line fluid, as is the case when exposed channels are formed in the valve seat.

As a further extension of the lubricating system, means is provided for applying lubricant to cavity 31 and thus to the cooperating surfaces between diaphragm 21 and shoulder 18, without interfering with jacking action of the plug or with lubrication of the seating surfaces of the plug and body. As shown in Fig. 1, this means consists of a groove or channel 51 of relatively small dimensions formed in the periphery of the valve plug, this groove having its one end communicating with the upper end of one of the channels 42, and having its other end opening thru the edge of shoulder 18 and thus communicating with annular cavity 31.

The object to be gained in having groove 51 of a relatively small dimension is to produce a lag in the fluid pressure of the lubricant conducted to the chamber 31. Because of the attenuated dimensions of the groove 51 and the viscosity of the lubricant employed, lubricant pressure is transmitted to the cavity 31 so slowly that the plug can be jacked from its seat before a pressure can be built up in cavity 31 great enough to interfere with this jacking action. If fluid pressure of a value not substantially less than that attained in chamber 32 were applied to cavity 31 from the lubricating system, there would be serious interference with proper jacking of the plug, or the jacking action might be entirely prevented. In this connection it should be noted that the area of the upper surface of shoulder 18 is generally substantially greater than the fluid pressure area presented by the small end of the plug, or at least the pressure area presented by shoulder 18 is not substantially less than the area of the small end of the plug. Thus application of a fluid pressure to cavity 31 which is not greatly less than fluid pressure applied to chamber 32, would cause the plug to be held within its seat. However by greatly reducing the pressure of the lubricant applied to cavity 31, jacking action of the plug is not interfered with in any manner. Lubricant supplied to cavity 31 is forced or wedged into the tapered annular cavity between the cooperating surfaces of diaphragm 21 and shoulder 18, thus serving to effectively seal these surfaces against line leakage.

Operation of the valve illustrated in Figs. 1 to 4 inclusive can be briefly reviewed as follows:— During long periods when the valve is not in use and there is no occasion to apply pressure to the lubricant by turning down screw 38, the pressure in the entire lubricant system assumes substantially that of the line pressure. However in the event it is desired to apply lubricant to more effectively seal the valve against leakage, or to jack the plug from its seat to enable turning movement, screw 38 is turned down to introduce lubricant under pressure into chamber 32, and from thence into the channels interrupting the valve working surfaces. In the event that cavity 31 is not already completely filled with lubricant, lubricant is supplied to this cavity at greatly reduced pressure thru channels 51. The occasional operation of screw 38 to apply pressure to the lubricant is sufficient to maintain a film of lubricant between the surfaces cooperating between diaphragm 21 and shoulder 18, so that leakage between the valve casing and the stem 16 is prevented. A slight amount of lubricant may extrude from the inner edge of diaphragm 21, in which event this lubricant finds its way upward to the packing engaging surface of stem 16. After a jacking operation, the plug is returned to its seat by virtue of packing 26. In explanation of the appended claims it may be stated that channels 51, together with the channels in the valve working surfaces by means of which channel 51 communicate with chamber 32, can be termed collectively an attenuated lubricant duct. It is of course evident that a part of the retardation, lag or reduction in the pressure of lubricant applied to cavity 31 takes place by virtue of the resistance to flow of viscous lubricant thru the channels in the valve working surfaces communicating between channels 51 and chamber 32. As distinguished from the remaining portion of the lubricating system of the valve, cavity 31 together with channels 51 can be termed a tertiary lubricating system.

It will be noted that when certain opposed channels are exposed to the line (during intermediate positions of the plug) a connected shunt path is not formed between these channels which includes cavity 31. Therefore when the valve is employed on high pressure lines, there can be no washing out of lubricant from cavity 31 when the valve plug is turned, such as might occur if line fluid could flow between the exposed longitudinal channels thru cavity 31.

The valve illustrated in Figs. 5 to 7 inclusive is somewhat similar to the valve of Figs. 1 to 4 inclusive, the main distinctions being that a different arrangement of lubricant channels interrupting the valve working surfaces is employed, and the pressure attenuating channels 51 have been omitted. Thus in this case the valve casing 56 is likewise provided with a tapered valve seat 57 arranged transversely of the fluid passageway 58. Tapered valve plug 59 is disposed within seat 57, and is provided with a valve stem 61. Flexible metallic diaphragm 62 has its outer peripheral portion engaging shoulder 63 formed on the valve casing, and the entire upper surface of this diaphragm is engaged by the annular resilient packing 64. Follower 66, which is bolted or otherwise secured to casing 56, presses down upon the upper surface of packing 64, and this packing in turn forces the inner peripheral portion of diaphragm 62 into engagement with the annular shoulder 67 formed upon the valve plug 59. Annular cavity 68 underlies diaphragm 62 and is in communication with the cooperating surfaces between this diaphragm and shoulder 67.

The lubricating system of the valve shown in Figs. 5 to 7 inclusive includes a threaded bore 69 extending axially of stem 61, into which the lubricant pressure screw 71 is threaded. A lubricant duct 72 extends downwardly thru plug 59, the upper end of this duct communicating with the lower end of bore 69, and the lower end of the duct communicating with the lubricant chamber 73 formed in the casing at the small end of the plug. Check valve 74 is positioned in bore 69 below screw 71.

The arrangement of lubricant channels in the valve working surfaces consists of spaced longitudinal channels 76 formed in the periphery of the plug 59. Both the upper and lower ends of the channels 76 stop short of the ends of the plug. Formed in the lower portion of the tapered valve seat are spaced branch channels 78, which communicate with the lower ends of longitudinal channels 76 for open and closed positions of the plug, and which also have free communication with lubricant chamber 73. Formed in the upper portion of the valve seat are spaced branch channels 79 which communicate with channels 76 for the same positions and which also communicate with annular cavity 68. It will be noted that channels 78 are relatively small in cross sectional area, so that they offer considerable resistance to flow of lubricant thru the same. Therefore these channels serve as attenuated ducts to convey viscous lubricant from chamber 73 to the annular pocket 68.

Operation of the valve illustrated in Figs. 5 to 7 inclusive is substantially the same as operation of the valve previously described. By turning down screw 71 a sufficiently high pressure can be attained in chamber 73 to jack the plug from its seat. However the fluid pressure transmitted at this time thru the fluid pressure attenuating channels 76 to packet 68, does not permit of a sufficient fluid pressure in pocket 68 to interfere with proper jacking action. The existence of viscous lubricant in pocket 68 effectively seals the valve against leakage between the stem and the casing, and at the same time effects sealing about the upper end of the plug. Leakage past the small end of the plug and around the sides of the plug is prevented by virtue of lubricant in chamber 73 together with the sealing of the valve working surfaces by virtue of lubricant introduced into channels 76. Thus a sealed port effect is afforded to prevent leakage past the plug when the valve is in closed position. In intermediate positions of the plug the two exposed channels 76 are cut off from communication with cavity 68, thus precluding washing out of lubricant in this cavity when the valve is used on high pressure lines.

The third modification of my invention illustrated in Figs. 8 to 10 inclusive is similar to that illustrated in Figs. 5 to 7 inclusive, except that a different arrangement of lubricant channels in the valve working surfaces is employed. In this case the tapered plug 79 is provided with longitudinal channels 80¹ and 81, interrupting its periphery. Channels 81 are relatively small in cross sectional area compared to channels 80¹. Likewise channels 81 have their upper ends communicating with cavity 68, while their lower ends stop short of the small end of the plug and are adapted to communicate with branch channels 78 formed in the lower portion of the valve seat. The lower end of longitudinal channels 80¹ communicate with lubricant chamber 73, while their upper ends stop short of the upper or large end of the plug. Radial ducts 83 formed in the plug 79 communicate between the lower end of bore 69, and the upper ends of channels 80¹.

Turning movement of the plug in the modification illustrated in Figs. 8 to 10 inclusive should be limited to 90 degrees by suitable stops. Fig. 10 illustrates closed position, and to open the valve the plug is turned 90 degrees in a counterclockwise direction. In turning the plug channels 81 are exposed to the line but at this time they are cut off from the lubricant chamber 73. In both open and closed positions all of the channels 80¹ and 81 are in communication with chamber 73. The larger lubricant channels 80¹ serve to effectively transmit the fluid pressure to the lubricant in chamber 73, without undue lag, but fluid pressure transmitting thru the smaller longitudinal channels 81 is greatly retarded so that fluid pressure transmitted to pocket 68 is not sufficient to interfere with proper jacking action. The same sealing effect is produced by the valve of Figs. 8 to 10 inclusive as the valves previously described, both with respect to leakage between the casing and the stem, and leakage past the plug when the plug is closed. If this valve is to be used on high pressure lines provision should be made for cutting off communication of one or both of channels 81 with the annular cavity 68, when the plug is in intermediate position and these channels are exposed to the line.

I claim:

1. In a rotatable plug valve, a valve casing having a passageway therethrough for flow of fluid and also having a tapered valve seat formed transversely of the passageway, a tapered valve plug rotatably disposed within the seat, means including a lubricant reservoir, a lubricant chamber adapted to receive viscous lubricant therefrom under pressure and a duct connecting said reservoir and chamber for hydraulically jacking the plug from its seat, and means effective for yieldably urging the plug into its seat and for sealing the casing at the large end of the plug, said last means including cooperating sealing surfaces together with an attenuated lubricant duct connecting said surfaces and said lubricant chamber.

2. In a rotatable plug valve, a valve casing having a passageway therethrough for flow of fluid and also having a tapered seat formed transversely of the passageway, a tapered valve plug rotatably disposed within the seat, means including a chamber adapted to receive viscous lubricant under pressure for hydraulically jacking the plug from its seat, a rotatable stem extending into the casing and having its inner end operably connected to the large end of the plug, said plug having a shoulder formed on its larger end surrounding the inner end of the stem, a flexible metallic diaphragm disposed adjacent the large end of the plug and extending in a plane substantially transversely of the axis of the plug, said diaphragm being apertured to accommodate the inner end of the stem and having its outer peripheral portions sealed with respect to the casing, resilient means acting between the casing and the diaphragm for urging the inner peripheral portion of the diaphragm into contact with said annular shoulder, and an attenuated lubricant duct communicating between said lubricant chamber and the cooperating contacting surfaces between said diaphragm and said shoulder.

3. In a rotatable plug valve, a valve casing having a passageway therethrough for flow of fluid and also having a tapered valve seat formed transversely of the passageway, a tapered valve plug rotatably disposed within the seat, a lubricant reservoir, a chamber formed within said casing, a duct adapted to convey lubricant under pressure from said reservoir to said chamber, and means for sealing the casing against leakage at the large end of the plug, said last means including annular cooperating sealing surfaces, and an attenuated lubricant duct connecting said lubricant chamber and said sealing surfaces and also arranged to interrupt the valve working surfaces between the plug and the casing.

4. In a rotatable plug valve, a valve casing having a passageway therethrough for flow of fluid and also having a tapered valve seat formed transversely of the passageway, a tapered valve plug rotatably disposed within the seat, means including a chamber adapted to receive viscous lubricant under pressure for hydraulically jacking the plug from its seat, and means effective for yieldingly urging the plug into its seat and for sealing the casing at the large end of the plug, said last means including annular cooperating sealing surfaces, together with a fluid pressure retarding lubricant duct communicating between said surfaces and said lubricant chamber and also arranged to interrupt the valve working surfaces between the plug and the casing.

5. In a rotatable plug valve, a valve casing having a passageway therethrough for flow of fluid and also having a tapered valve seat formed transversely of the passageway, a tapered valve plug rotatably disposed within the bore, means including a chamber adapted to receive viscous lubricant under pressure for hydraulically jacking the plug from its seat, a rotatable stem extending into the casing and having its inner end oppositely connected to the large end of the plug, said plug having an annular shoulder formed on its large end surrounding the inner end of the stem, a diaphragm disposed adjacent the large end of the plug and extending in a plane substantially at right angles to the axis of the plug said diaphragm being apertured to accommodate the inner end of said stem and having its outer peripheral portion sealed with respect to the casing, yieldable means acting between the diaphragm and the casing for urging the inner peripheral portion of the diaphragm into contact with said annular shoulder, and a fluid pressure retarding lubricant duct communicating between said chamber and the cooperating surfaces between said shoulder and said diaphragm, said duct also being arranged to supply lubricant to the valve working surfaces between the plug and the casing.

6. In a rotatable plug valve, a valve casing having a passageway therethrough for flow of fluid and also having a tapered valve seat formed transversely of the passageway, a tapered valve plug rotatably disposed within the seat, a rotatable stem extending into the casing and operatively connected to the large end of the plug, said large end of the plug having an annular shoulder formed thereon surrounding the inner end of the stem, a member having an annular surface adapted to contact with the annular surface formed by said shoulder and being sealed with respect to the casing, means for yieldingly urging the plug into its seat, and a pressure lubricant system for said valve, said pressure lubricant system including a lubricant chamber formed within the casing at the small end of the plug whereby upon introducing lubricant into said chamber under sufficiently high pressure the plug is jacked from its seat hydraulically, and an attenuated lubricant duct communicating between said system and the cooperating surfaces between said annular shoulder and said member, said duct serving to apply lubricant to said cooperating surfaces at a fluid pressure substantially less than that existing in said chamber, whereby application of such lubricant between said cooperating surfaces does not interfere with jacking action of the plug.

7. In a rotatable valve plug, a valve casing having a passageway therethrough for flow of fluid and also having a tapered valve seat formed transversely of the passageway, a tapered valve plug rotatably disposed within the seat, a rotatable stem extending into the casing and having its inner end operatively connected to the large end of the plug, the fluid pressure area presented by the large end of the plug surrounding the inner end of the stem being not substantially less than the fluid pressure area presented by the small end of the plug, the large end of the plug being provided with an annular shoulder surrounding the inner end of the stem, a member sealed with respect to the casing and having an annular surface adapted to contact with and cooperate with the annular surface formed by said shoulder, means for yieldingly urging the plug into its seat, and a pressure lubricant system for said valve, said system including a chamber formed within the casing at the small end of the plug and adapted to receive lubricant under sufficient pressure to hydraulically jack the plug from its seat, an attenuated duct communicating between said system and said cooperating surfaces, said duct serving to apply lubricant to said cooperating surfaces at a pressure which is relatively low compared to pressure existing within said chamber at the time the plug is jacked.

8. In a rotatable plug valve, a valve casing having a passageway therethrough for flow of fluid and also having a tapered valve seat formed transversely of the passageway, a tapered valve plug rotatably disposed within the seat, a rotatable stem extending into the casing and operatively connected to the large end of the plug, said large end of the plug surrounding said stem affording a fluid pressure area which is not substantially less than the fluid pressure area presented by the small end of the plug, said large end of the plug being formed to provide an annular shoulder surrounding the inner end of the stem, a member sealed with respect to the casing and having an annular surface adapted to contact and cooperate with an annular surface formed by said shoulder, means for yieldingly urging the plug into its seat, and a pressure lubricant system for said valve, said pressure lubricant system including a chamber formed within the casing at the small end of the plug whereby the plug can be hydraulically jacked from its seat when the chamber is subjected to lubricant at sufficient pressure, and an attenuated lubricant duct communicating between said system and said cooperating surfaces, said duct being of such a character that the pressure lubricant applied to said cooperating surfaces is relatively low compared to lubricant pressure in said chamber at the time the plug is jacked, said duct being arranged to interrupt the valve working surfaces.

9. In a rotatable valve plug, a valve casing having a passageway therethrough for flow of fluid and also having a tapered valve seat formed transversely of the passageway, a tapered valve plug rotatably disposed within the seat, a rotatable stem extending into the casing and operatively connected to the large end of the plug, said large end of the plug having formed thereon a shoulder surrounding the inner end of the stem, a flexible metallic diaphragm positioned adjacent the large end of the plug and extending in a plane substantially at right angles to the axis of the plug, the outer peripheral portion of said diaphragm being sealed with respect to the casing, said diaphragm being also apertured to accommodate the inner end of the stem, yielding means acting between the casing and the diaphragm for urging the inner peripheral portion of the diaphragm into contact with the annular surface afforded by said shoulder, whereby said plug is yieldingly urged into its seat, the arrangement of said diaphragm when urged into contact with said shoulder forming an annular space surrounding the cooperating surfaces between the diaphragm and said shoulder, and a pressure lubricant system for said valve, said lubricant system including a chamber formed in the casing at the small end of the plug adapted to receive viscous lubricant under pressure to effect jacking of the plug, and an attenuated duct serving to communicate between said chamber and said annular space.

10. In a rotatable valve plug, a valve casing having a passageway therethrough for flow of fluid and also having a tapered valve seat formed transversely of the passageway, a tapered valve plug rotatably disposed within the seat, a rotatable stem extending into the casing and operatively connected to the large end of the plug, said large end of the plug having formed thereon a shoulder surrounding the inner end of the stem, a flexible metallic diaphragm positioned adjacent the large end of the plug and extending in a plane substantially at right angles to the axis of the plug, the outer peripheral portion of said diaphragm being sealed with respect to the casing, said diaphragm being also apertured to accommodate the inner end of the stem, yielding means acting between the casing and the diaphragm for urging the inner peripheral portion of the diaphragm into contact with the annular surface afforded by said shoulder, whereby said plug is yieldingly urged into its seat, the arrangement of said diaphragm when urged into contact with said shoulder forming an annular space surrounding the cooperating surfaces between the diaphragm and said shoulder, and a pressure lubricant system for said valve, said lubricant system including a chamber formed in the casing at the small end of the plug adapted to receive viscous lubricant under pressure to effect jacking of the plug, and a fluid pressure retarding duct serving to communicate between said chamber and said annular space, said duct being arranged to interrupt the valve working surfaces.

11. In a rotatable valve plug, a valve casing having a passageway therethrough for flow of fluid and also having a tapered valve seat formed transversely of the passageway, a tapered valve plug rotatably disposed within the seat, a rotatable stem extending into the casing and connected to the large end of the plug, said plug having an annular shoulder formed on its large end surrounding the inner end of the stem, a member sealed with respect to the casing and having an annular surface adapted to contact and cooperate with the annular surface afforded by said shoulder, means for yieldingly urging the plug into its seat, and a pressure lubricant system for said valve, said lubricant system including a lubricant chamber formed in said stem adapted to receive viscous lubricant under pressure, a second lubricant chamber formed in the valve casing at the small end of the plug, a duct extending longitudinally of the plug and communicating between said chambers, said duct being located inwardly of the periphery of the plug, and lubricant channels interrupting the valve working surfaces and adapted to communicate at spaced points with said second chamber and said cooperating surfaces, whereby the lubricant is caused to flow thru said channels before being applied to said cooperating surfaces.

12. In a plug valve, a valve casing, a valve plug rotatably disposed within the casing, a rotatable stem extending into the casing and secured to one end of the plug, the plug affording an annular shoulder surrounding the inner end of the stem, a flexible diaphragm sealed with respect to the casing and disposed adjacent the shoulder, means for urging the diaphragm against said shoulder whereby an annular area of contact is provided, there being an annular recess surrounding and in communication with said area of contact, and a pressure lubricating system for said valve, said system including longitudinal lubricant channels in the valve working surfaces, two of which are exposed to the line when the plug is turned between open and closed positions, and a duct establishing communication between at least certain of said channels and said recess without forming a shunt path between said two channels when exposed to the line.

13. In a rotatable plug valve, a casing having a passageway therethrough for flow of fluid and also having a tapered bore extending transversely of the passageway, a tapered valve plug disposed within said bore, means for urging said plug in the direction of its smaller end, and a pressure lubricating system for said valve, said system including a lubricant reservoir, a chamber formed within the casing at the small end of the plug adapted to receive lubricant under pressure from said reservoir to effect hydraulic jacking of the plug relative to the casing, and a duct connecting said chamber and reservoir, a lubricant recess formed within the casing at the large end of the plug and an attenuated connection between said chamber and said recess whereby lubricant introduced into said recess will not interfere with jacking action.

14. In a rotatable plug valve, a casing having a passageway therethrough and also having a tapered bore extending transversely of the passageway, a tapered valve plug disposed within said bore, means for urging said plug in the direction of its smaller end, and a pressure lubricating system for said valve, said system including a lubricant reservoir, a chamber formed within the casing at the small end of the plug adapted to receive lubricant under pressure from said reservoir to effect hydraulic jacking of the plug relative to the casing and a duct connecting said reservoir and chamber, a lubricant recess formed within the casing at the large end of the plug, and an attenuated connection between said chamber and said recess whereby lubricant introduced into said recess will not interfere with jacking action, said last connection being arranged to also distribute lubricant between the valve working surfaces.

15. In a rotatable plug valve, a valve casing having a passageway therethrough for flow of fluid and also having a tapered seat formed transversely of the passageway, a tapered valve plug rotatably disposed within the seat, means including a chamber adapted to receive viscous lubricant under pressure for hydraulically jacking the plug from its seat, said plug having an annular shoulder formed on its larger end, a flexible metallic diaphragm disposed adjacent the large end of the plug and extending in a plane substantially transversely of the axis of the plug, said diaphragm having an aperture aligned with the axis of the plug and having its outer peripheral portion sealed with respect to the casing, resilient means for urging the inner peripheral portion of the diaphragm into contact with said annular shoulder, and an attenuated lubricant duct communicating between said lubricant chamber and the cooperating contacting surfaces between said diaphragm and said shoulder.

16. In a rotatable plug valve, a valve casing having a passageway therethrough for flow of fluid and also having a tapered valve seat formed transversely of the passageway, a tapered valve plug rotatably disposed within the seat, means including a lubricant reservoir, a lubricant chamber and a duct adapted to convey viscous lubricant under pressure from said reservoir to said chamber for hydraulically jacking the plug from its seat, and means for yieldingly urging the plug into its seat and for sealing the casing at the large end of the plug, said last means including movable annular cooperating sealing surfaces, and an attenuated lubricating duct connecting said surfaces and said lubricant chamber whereby the lubricant pressure at said surfaces is maintained substantially lower than in said chamber while the plug is being jacked.

17. In a rotatable plug valve, a valve casing having a passageway therethrough for flow of fluid, a tapered valve seat formed transversely of said passageway, a tapered valve plug rotatably disposed within said seat, means adjacent one end of said plug for jacking said plug from said seat, means adjacent the opposite end of said plug for sealing said valve, said means comprising movable seating surfaces having an annular area of contact, and pressure lubricating means serving to present a wedge of lubricant to the outer periphery of said area.

18. In a valve of the plug type, a casing having a passageway therethrough and a plug seat formed transversely of said passageway, a valve plug rotatably disposed within said seat, means for yieldingly holding said plug in said seat, a pressure lubricating system for supplying lubricant to said seat and for effecting longitudinal movement of the plug relative to said seat including means for conducting lubricant from one end of said plug to the other end thereof at a substantial loss in pressure, and means for rotating said plug.

19. In a rotatable plug valve, a valve casing having a passageway therethrough for flow of fluid, a tapered valve seat formed transversely of said passageway, a tapered valve plug rotatably disposed within said seat, means including a lubrican reservoir, a lubricant chamber and a duct adapted to convey viscous lubricant from said reservoir to said chamber under pressure for hydraulically jacking said plug from said seat, and means effective for yieldably urging said plug into said seat and for sealing said casing at the large end of said plug, said last means including cooperating sealing surfaces together with an attenuated lubricant duct connecting said surfaces and said lubricant chamber.

20. In a rotatable plug valve, a casing having a passageway therethrough for flow of fluid, a tapered bore extending transversely of said passageway, a tapered valve plug disposed within said bore, a rotatable stem operatively connected to said plug, said stem having substantially smooth surfaces, means for yieldably urging said plug into said seat and for sealing said casing at the large end of said plug, said latter means including movable annular cooperating sealing surfaces adapted to form a seal with lubricant, means including a lubricant chamber adapted to receive lubricant under pressure for hydraulically jacking said plug from said seat, and an attenuated lubricating duct connecting said lubricant chamber and said sealing surfaces whereby the lubricant pressure at said surfaces is maintained substantially lower than in said chamber while the plug is being jacked.

21. In a rotatable plug valve, a casing having a passageway therethrough for flow of fluid, a tapered bore extending transversely of said passageway, a tapered valve plug disposed within said bore, a rotatable stem operatively connected to said plug, said stem having substantially smooth surfaces, means for urging said plug in the direction of its smaller end, a lubricating system for said valve including a chamber formed within said casing at the small end of said plug adapted to receive lubricant under pressure to effect hydraulic jacking of said plug relative to said casing, a lubricant recess formed within said casing at the large end of said plug, and an attenuated connection between said chamber and said recess whereby lubricant introduced into said recess will not interfere with jacking action, said last connection being also arranged to distribute lubricant between the valve working surfaces.

22. In a valve in which a tapered plug is mounted in a tapered seat in a casing, said casing forming a lubricant chamber with the small end of the plug, a cover at the large end of the plug and forming therewith a second lubricant chamber, means for introducing lubricant under pressure into the chamber at the small end of the plug for jacking the same from its seat, and means for conducting lubricant to the second lubricant chamber from the first chamber at a substantially reduced pressure.

23. In a valve of the plug type, a casing having a passageway therethrough and a plug seat formed transversely of the passageway, a valve plug rotatably disposed within said seat, lubricant grooves in the seating surface of the valve, means including a hollow stem projecting from said plug for introducing lubricant under pressure to said grooves, and a cover member providing a lubricant chamber at the large end of the plug, said grooves being in communication therewith and being attenuated to produce a pressure lag of the lubricant therein.

SVEN JOHAN NORDSTROM.